United States Patent [19]

Hulsey

[11] Patent Number: 5,338,141
[45] Date of Patent: Aug. 16, 1994

[54] CORROSION RESISTANT CAP FOR FASTENER

[75] Inventor: Tommy R. Hulsey, Wyomissing, Pa.

[73] Assignee: Construction Fasteners, Inc., Wyomissing, Pa.

[21] Appl. No.: 97,525

[22] Filed: Jul. 27, 1993

[51] Int. Cl.⁵ .................. F16B 19/00; F16B 33/00
[52] U.S. Cl. .................... 411/375; 411/369; 411/377
[58] Field of Search ............ 411/369, 373, 375, 377, 411/429–431, 542

[56] References Cited

U.S. PATENT DOCUMENTS

| | | | |
|---|---|---|---|
| 3,803,972 | 4/1974 | Deutsher | 411/375 X |
| 4,041,834 | 8/1977 | Herkes et al. | 411/919 X |
| 4,373,842 | 2/1983 | Bettini et al. | 411/377 |
| 4,749,321 | 6/1988 | Knohl et al. | 411/369 X |
| 4,887,951 | 12/1989 | Hashimoto | 411/369 X |
| 5,156,509 | 10/1992 | Wu | 411/369 |

*Primary Examiner*—Neill R. Wilson
*Attorney, Agent, or Firm*—Caesar, Rivise, Bernstein, Cohen & Pokotilow, Ltd.

[57] ABSTRACT

A corrosion-resistant cap for use with a fastener and an elastomeric washer. The cap has a hollow head forming a cavity into which the head of the washer is placed, a perimeter outer skirt, and an inner skirt which can be swaged or bent from a longitudinal position to a transverse position perpendicular to the axis of the fastener to make contact and cover the lower surface of the flange of the fastener. This completely encloses the flange and head of the fastener and forms a cavity defined by the outside surface of the inner skirt and the inside surface of the outer skirt. An elastomeric washer will then be threaded onto the threaded shank of the fastener so that it is positioned and held in place by the cavity. Thus, when the fastener and cap are tightened down onto an object, the elastomeric material of the washer flows, completely filling the cavity and the area between the bottom of the outer skirt and the object to which the fastener is attached.

11 Claims, 2 Drawing Sheets

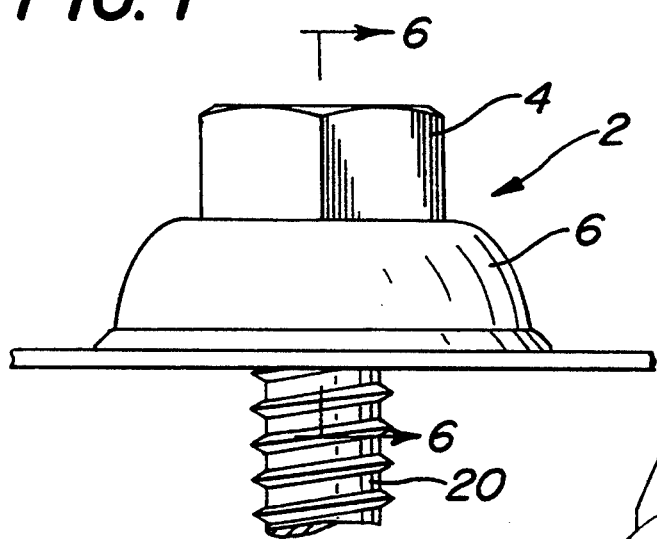
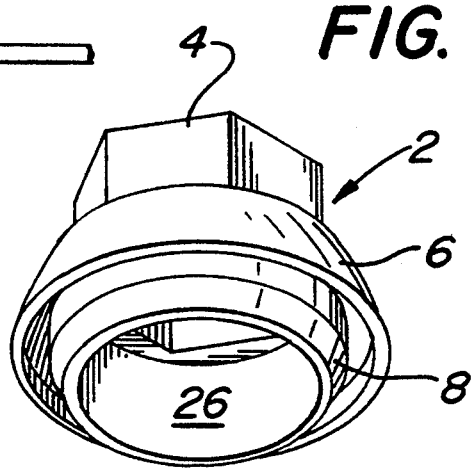
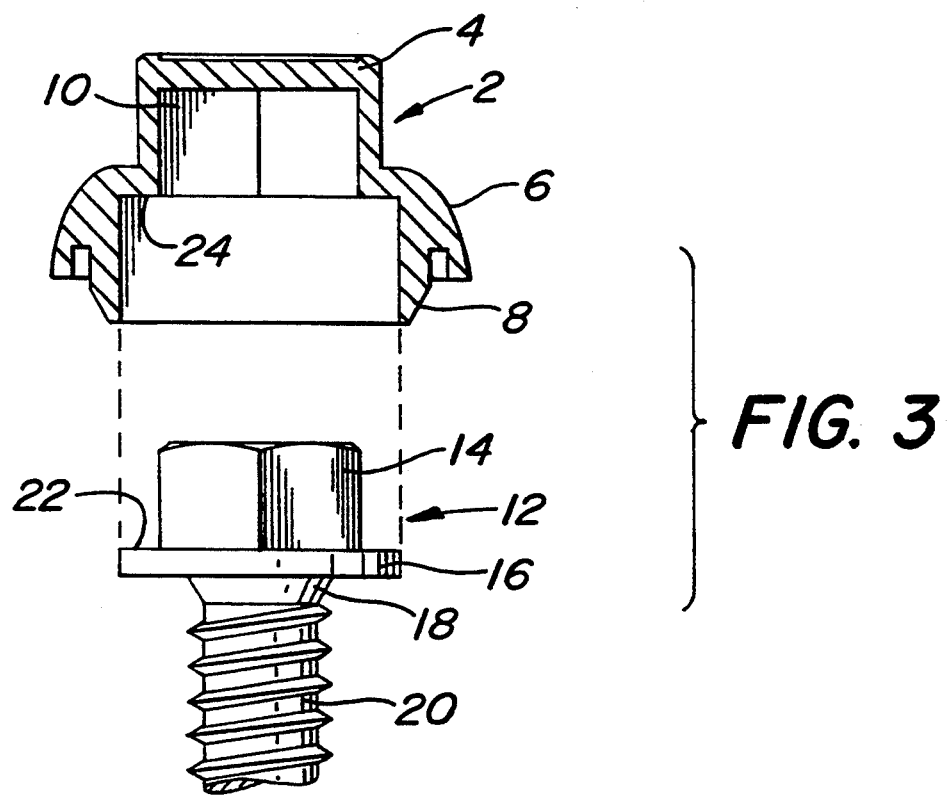

CORROSION RESISTANT CAP FOR FASTENER

BACKGROUND OF THE INVENTION

This invention relates generally to corrosion-resistant caps used in connection with fastener and in particular, to corrosion-resistant caps used with moisture-proof, elastomeric washers.

A corrosion-resistant cap for a fastener is disclosed in U.S. Pat. No. 4,460,300 (Bettini et al.). The cap has a single skirt which is bent and crimped beneath the head of the fastener. A sealing washer is placed between the lower surface of the cap and the object in which the fastener is placed to provide a moisture and weather resistant seal after the fastener is tightened.

A similar cap is disclosed in U.S. Pat. No. 3,803,972 (Deutsher) which specifies a cap having a skirt which is crimped beneath the flange on the head of the fastener. It also uses a washer with a resilient material to provide a tight seal. The caps of both Bettini and Deutsher are used with fasteners which have downwardly sloping flanges. The fasteners are used to connect two panels together, with the upper panel having a hole therein to form a cavity into which the washer is placed and in which elastomeric material of the washer will flow.

However, none of the presently available caps disclose a cap with an inner and outer skirt. The inner skirt is swaged or bent beneath the flange of the fastener so that the inner surface of the inner skirt makes contact with and covers the lower surface of the flange. Thus, the entire head and flange of the fastener are enclosed by the cap material without the necessity for bending the outer skirt, which reduces the diameter of the skirt, resulting in a more positive and tighter seal than heretofore available.

OBJECTS OF THE INVENTION

Accordingly, it is the general object of the instant invention to provide a corrosion-resistant cap for a fastener which overcomes the shortcomings of, and improves upon, present caps.

It is a further object of the instant invention to provide a corrosion-resistant cap for use with a fastener which completely encloses the head and flange of the fastener.

It is still a further object of the instant invention to provide a corrosion-resistant cap with a swageable inner skirt which can be bent so that the inner surface of the inner skirt makes contact with the lower surface of the flange of the fastener.

It is still yet a further object of the instant invention to provide a corrosion-resistant cap for use with a fastener which has a cavity which enables the positive seating of an elastomeric washer placed on the threaded shank of the fastener.

It is another object of the instant invention to provide a corrosion-resistant cap for use with a fastener which has a perimeter outer skirt which is not deformed or bent to hold the head and flange of the fastener in place.

It is still another object of the instant invention to provide a corrosion-resistant cap for use with a fastener and with an elastomeric washer which protects the fastener from moisture and from other corrosive elements.

SUMMARY OF THE INVENTION

These and other objects of the instant invention are achieved by providing a corrosion-resistant cap which has a head, a swageable inner skirt and an outer skirt. The cavity within the head tightly conforms to the shape of the head of the fastener so that the fastener head and flange may be inserted into the cavity. The swageable inner skirt is then bent from its original longitudinal position, i.e., parallel to the axis of the fastener, to a horizontal position wherein the inside surface of the inner skirt makes contact with and covers the lower surface of the flange.

After the inner skirt has been swaged, an elastomeric, moisture-impervious resilient washer is placed on the threaded shaft so that it contacts the inner skirt. The washer is placed in a cavity formed by the outside surface of the inner skirt and the inner surface of the outer skirt. When the fastener and cap are tightened, the elastomeric material of the washer flows, completely filling the cavity and the area beneath the lower surfaces of the skirts and the panel or object to which the fastener has been attached.

DESCRIPTION OF THE DRAWING

Other objects and many of intended advantages of this invention will be readily appreciated when the same becomes better understood by reference to the following detailed description when considered in connection with the accompanying drawings wherein:

FIG. 1 is a side view of the cap into which the head and flange of the fastener have been inserted.

FIG. 2 is an isometric view of the cap.

FIG. 3 is an exploded cross-sectional view of the cap and the fastener prior to insertion of the head of the fastener into the cavity of the cap.

DETAILED DESCRIPTION OF THE PREFERRED EMBODIMENTS

Figure 4:
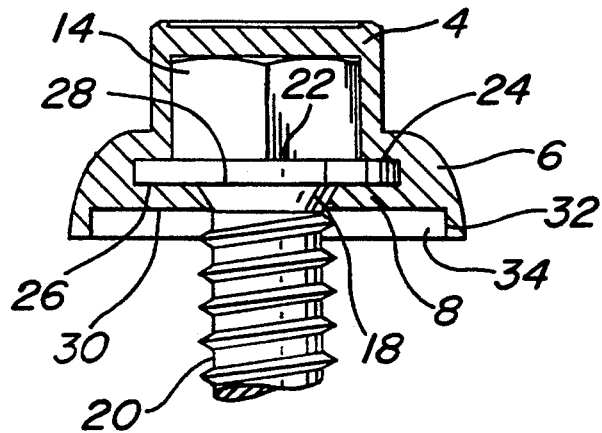
FIG. 4 is a side view of the cap in section with the inner skirt swaged to hold the fastener in place.

Referring now in greater detail to the various figures of the drawing, wherein like reference characters refer to like parts, there is shown in FIGS. 1, 2 and 3, the corrosion-resistant cap 2 of the present invention. As can be seen in the figures, the cap 2 has a head 4 and an outer skirt 6, attached to the head. Also attached to the head 4 is a cylindrically-shaped, longitudinally extending inner skirt 8.

Referring to FIG. 3, the head 4 and the inner skirt 8 form a cavity 10. The fastener 12 comprises a head 14 and a flange 16. Connected to the flange 16 is a tapered element 18 and a threaded shank 20. The cavity 10 closely conforms to the size and shape of the head 14 and the flange 16 of the fastener 12. Therefore, the head 14 and the flange 16 are fitted within the cavity 10 with the upper surface 22 of the flange 16 abutting the lower surface 24 of the head 4.

As can be seen in FIG. 4, after the head and flange have been fitted into the cavity 10 of the cap 2, the inner skirt 8 is bent or swaged so that it is positioned transversely, i.e., perpendicular to the axis of the fastener, rather than longitudinally as in its unbent position. The inner skirt 8 has an inside surface 26 and an outside surface 30. When the inner skirt 8 is bent into position, its inner surface 26 abuts the lower surface 28 of the flange 24. Thus, the head 14, the flange 16 and the tapered element 18 are completely enclosed by the corrosion-resistant material of the cap 2.

Figure 5:
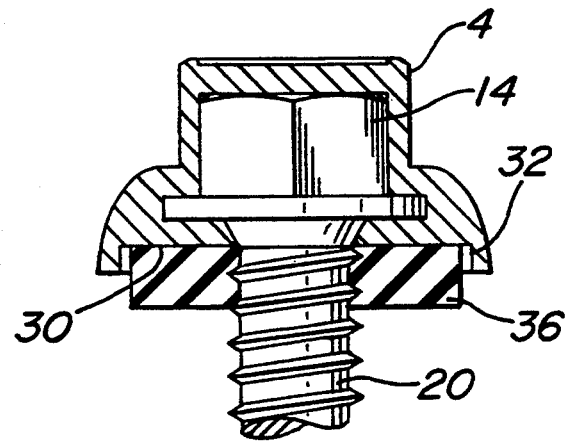
FIG. 5 is a side view of the cap in section with the fastener head and flange held in place by the swaged inner skirt and the elastomeric washer threaded onto the shank of the fastener so that it abuts the outside surface of the inner skirt.

Referring now to FIG. 5, after the head 14, the flange 16 and the tapered portion 18 have been enclosed by the cap 2, an elastomeric, moisture-resistant washer 36 is threaded onto the threaded shank 20. The washer 36 is positioned on the threaded shank 20 so that it abuts the outside surface 30 of the inner skirt 8. The inner diameter of the washer 36 is sized to provide a tight, interference fit with the threaded shank 20.

Figure 6:
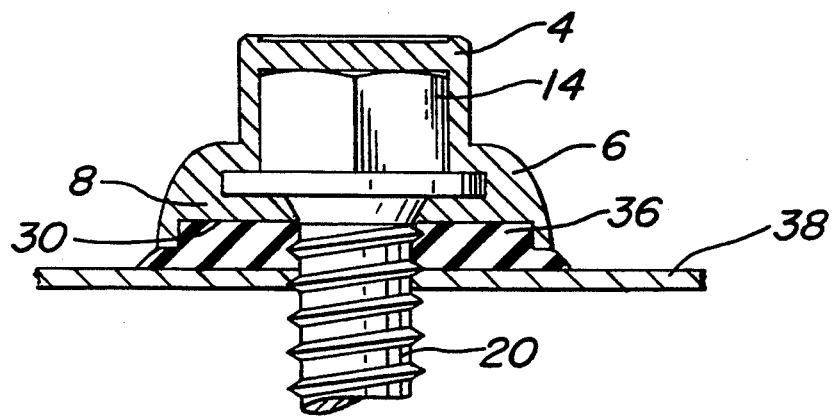
FIG. 6 is a side view showing the cap in section with the fastener fastened into an object and tightened down, causing the elastomeric washer to flow and fill the cavity between the cap and the object.

The outer skirt 6 has an inner surface 32 which, together with the outside surface 30 of the inner skirt 8, forms a cavity 34 into which the elastomeric washer 36 is placed. This positively positions and retains the elastomeric washer 36, in place when the fastener 12 is screwed tightly into an object 38 as shown in FIG. 6. The pressure created by the cap when the fastener and cap combination is tightened causes the elastomeric washer material to flow, completely filling the cavity 34 and the area beneath the outer skirt 6 and the object 38 to which the fastener 14 is attached.

A cap for a fastener has been described which completely encloses and holds the head and flange of the fastener and which provides a cavity to hold and retain an elastomeric washer in place when the fastener is attached to an object and tightened. Thus, an extremely tight and improved seal is formed without the necessity to bend or deform the outer skirt, thereby reducing the breadth of the outer skirt.

The cap may comprise a non-corrosive, long lasting, zinc aluminum alloy such as the ZAC TM zinc aluminum cast head produced by Construction Fasteners of Wyomissing, Pa. The fastener may be a commonly used carbon steel fastener and the elastomeric washer can be made of an EPDM or similar resilient, sealing material.

Without further elaboration, the foregoing will so fully illustrate my invention that others may, by applying current or future knowledge, readily adapt the same for use under the various conditions of service.

I claim:

1. A fastening system comprising a fastener having a threaded shank with a longitudinal axis, a metallic corrosion-resistant cap and an elastomeric washer positioned on said threaded shank, said fastener comprising a first head, a radially extending flange beneath said head, and a threaded shank connected to and extending below said flange, and said cap comprising a second head having a cavity for receiving said first head and said flange, a swageable inner skirt and a perimeter outer skirt, said perimeter outer skirt having a flat bottom surface which lies in a plane which is perpendicular to the plane of the longitudinal axis of said threaded shank, and having a circular inside surface at a fixed radial distance from said longitudinal axis of said threaded shank so that a plane tangential to said inner surface is parallel to the plane of said longitudinal axis.

2. The system of claim 1 wherein said flange has an upper surface and a lower surface and said inner skirt has a first surface, a second surface and a lower end, said second surface being angled inward toward the longitudinal axis of said threaded shank forming a wedge shape at said lower end, and wherein said inner skirt is swaged from a longitudinal position to a transverse position relative to the longitudinal axis of said fastener so that said first surface of said inner skirt contacts said lower surface of said flange to completely enclose said first head and said flange in said cavity.

3. The system of claim 2 wherein when said outer skirt has an inside surface and an outside surface and wherein said second surface of said inner skirt and said inside surface of said outer skirt form a second cavity.

4. The system of claim 3 wherein said elastomeric washer is positioned on said threaded shank in said second cavity.

5. The system of claim 4 wherein said corrosion-resistant cap comprises a zinc aluminum casting.

6. The system of claim 5 wherein said fastener comprises carbon steel.

7. The system of claim 6 wherein said elastomeric washer is impervious to moisture.

8. A corrosion-resistant metallic cap for a fastener having a threaded shank with a first longitudinal axis, said cap having a second longitudinal axis and comprising a head defining a first cavity within said head, a swageable cylindrically-shaped inner skirt attached to said head and disposed longitudinally in a first position and a perimeter outer skirt, attached to said head, said perimeter outer skirt having a flat bottom surface which lies in a plane which is perpendicular to the plane of the longitudinal axis of said threaded shank, and having a circular inside surface at a fixed radial distance from said longitudinal axis of said threaded shank so that a plane tangential to said inner surface is parallel to the plane of said longitudinal axis.

9. The cap of claim 8 wherein said fastener further comprises a second head and a flange, and said first cavity is sized to provide a conforming fit for said second head and said flange when said second head and flange are inserted into said cavity.

10. The cap of claim 9 wherein said inner skirt has a first surface, a second surface, and a lower end, said second surface being angled inward toward said first longitudinal axis forming a wedge shape at said lower end, and wherein said inner skirt is swaged to a second transverse position perpendicular to said first position and wherein said inner skirt abuts said flange so that said first head and said inner skirt completely enclose said second head and said flange.

11. The cap of claim 10 wherein said inner skirt, after it has been swaged, and said outer skirt define a cavity into which a elastomeric washer, threaded onto said shank, is positioned, for restraining said washer when said cap and fastener are threaded into an object.

* * * * *